United States Patent
Varma et al.

(10) Patent No.: US 6,625,589 B1
(45) Date of Patent: Sep. 23, 2003

(54) METHOD FOR ADAPTIVE THRESHOLD COMPUTATION FOR TIME AND FREQUENCY BASED ANOMALOUS FEATURE IDENTIFICATION IN FAULT LOG DATA

(75) Inventors: Anil Varma, Clifton Park, NY (US); Nicholas Edward Roddy, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 476 days.

(21) Appl. No.: 09/633,094

(22) Filed: Aug. 4, 2000

Related U.S. Application Data

(60) Provisional application No. 60/161,974, filed on Oct. 28, 1999.

(51) Int. Cl.[7] ............................ G06F 17/00; G06E 1/00; G05B 9/02
(52) U.S. Cl. .............................. 706/45; 706/21; 700/79
(58) Field of Search ........................ 706/21, 45; 700/79

(56) References Cited

U.S. PATENT DOCUMENTS

| | | | |
|---|---|---|---|
| 4,258,421 A | 3/1981 | Juhasz et al. | |
| 4,270,174 A | 5/1981 | Karlin et al. | |
| 4,463,418 A | 7/1984 | O'Quin, III et al. | |
| 4,517,468 A | 5/1985 | Kemper et al. | |
| 4,695,946 A | 9/1987 | Andreasen et al. | |
| 4,823,914 A | 4/1989 | McKinney et al. | |
| 4,970,725 A | 11/1990 | McEnroe et al. | |
| 4,977,390 A | 12/1990 | Saylor et al. | |
| 5,113,489 A | 5/1992 | Cihiwsky et al. | |
| 5,123,017 A | 6/1992 | Simpkins et al. | |
| 5,274,572 A | 12/1993 | O'Neill et al. | |
| 5,282,127 A | 1/1994 | Mii | |
| 5,321,837 A | 6/1994 | Daniel et al. | |
| 5,329,465 A | 7/1994 | Arcella et al. | |
| 5,400,018 A | 3/1995 | Scholl et al. | |
| 5,406,502 A | 4/1995 | Haramaty et al. | |
| 5,442,553 A | 8/1995 | Parrillo | |
| 5,445,347 A | 8/1995 | Ng | |
| 5,508,941 A | 4/1996 | Leplingard et al. | |
| 5,528,499 A | 6/1996 | Hagenbuch | |
| 5,528,516 A | 6/1996 | Yemini et al. | |
| 5,594,663 A | 1/1997 | Messaros et al. | |
| 5,631,832 A | 5/1997 | Hagenbuch | |
| 5,633,628 A | 5/1997 | Denny et al. | |
| 5,638,296 A | 6/1997 | Johnson et al. | |
| 5,650,928 A | 7/1997 | Hagenbuch | |
| 5,650,930 A | 7/1997 | Hagenbuch | |
| 5,661,668 A | 8/1997 | Yemini et al. | |
| 5,666,534 A | 9/1997 | Gilbert et al. | |
| 5,678,002 A | 10/1997 | Fawcett et al. | |
| 5,713,075 A | 1/1998 | Threadgill et al. | |
| 5,742,915 A | 4/1998 | Stafford | |
| 5,809,161 A | 9/1998 | Auty et al. | |
| 5,842,125 A | 11/1998 | Modzelesky et al. | |

(List continued on next page.)

OTHER PUBLICATIONS

Johnson, Daniel; Data–Tronic Gas Turbine Information and Control System; 1981; Schenectady, New York; USA.

*Primary Examiner*—George B. Davis
(74) *Attorney, Agent, or Firm*—Carl A. Howold; John L. DeAngelis, Jr.; Beusse Brownlee Bowdoin & Wolter, P.A.

(57) ABSTRACT

An algorithm for improving the probability of identifying the repair that will correct a fault aboard a machine, such as a locomotive. The invention utilizes historical fault log and repair data and further calculates the number of times a particular fault occurs in a given number of days and also the number of times a particular fault occurs on each day. Averages are calculated for these results and when the number of fault occurrences exceed some or more of those averages, then these faults are deemed statistically significant for subsequent processing.

18 Claims, 9 Drawing Sheets

U.S. PATENT DOCUMENTS

| | | |
|---|---|---|
| 5,845,272 A | 12/1998 | Morjaria et al. |
| 5,884,073 A | 3/1999 | Dent |
| 5,884,202 A | 3/1999 | Arjomand |
| 5,926,745 A | 7/1999 | Threadgill et al. |
| 5,949,345 A | 9/1999 | Beckert et al. |
| 5,950,147 A | 9/1999 | Sarangapani et al. |
| 5,988,645 A | 11/1999 | Downing |
| 6,028,537 A | 2/2000 | Suman et al. |
| 6,058,307 A | 5/2000 | Garner |
| 6,094,609 A | 7/2000 | Arjomand |
| 6,104,988 A | 8/2000 | Klarer |
| 6,112,085 A | 8/2000 | Garner et al. |
| 6,161,071 A | 12/2000 | Shuman et al. |
| 6,169,943 B1 | 1/2001 | Simon et al. |
| 6,343,236 B1 | 1/2002 | Gibson et al. ............... 700/79 |

* cited by examiner

FIG. 2

| CUST | UNIT | DATE | CODE | DESC | DESCRIPTION | FAILMODE_DESC | SUB_ASSEMBLY_CODE | MAIN_ASSEMBLY_CODE |
|---|---|---|---|---|---|---|---|---|
| RR | 3500 | Sun Jul 13 1997 | 1111 | Piping Fittings-Engine Intercooler | REPAIRED WATER LEAK AT TOP OF RT | LEAKING FLUID AIR | ENGINTCOOL | ENGINE |
| RR | 3500 | Tue Jul 01 1997 | 2222 | Lube Oil - Engine | WTER IN LUBE OIL CHANGED OIL | CONTAMINATED | LUBEOIL | ENGISUPT |
| RR | 3500 | Sun Jun 28 1997 | 3333 | DRP - Battery Charger Regulator Panel | NO BATTCHARGE-REPL DRP | UNKNOWNUNDETERMI | POWERPANEL | POWERELN |
| RR | 3500 | Wed Jun 18 1997 | 4444 | EFI - High Pressure Pump | REPLACE 3HP PUMPS FOR NOT FIRING | UNKNOWNUNDETERMI | ENGFUELINJ | ENGINE |
| RR | 3500 | Mon Jun 09 1997 | 5555 | Turbocharger Assembly - General - Eng | TURBO DRAGSSECONDARY DAMAGE-RPL | UNKNOWNUNDETERMI | ENGTURBO | ENGINE |
| RR | 3500 | Sat May 24 1997 | 6666 | Cylinder Assembly - General - Eng | REPL N6 PA FOR SECONDARY DAMAGE | UNKNOWNUNDETERMI | POWERASSY | ENGINE |
| RR | 3500 | Sat May 24 1997 | 7777 | Cylinder Assembly - General - Eng | TRIPPING COP PISTON FAILURE CO | UNKNOWNUNDETERMI | POWERASSY | ENGINE |

FIG. 3

```
RR 3500 03-MAY-1997 1000  90623.06 90637.20  0.0 CS 0 1 2 0 101  97 R E 0 0                                           Intake Manifold Air Too
RR 3500 03-MAY-1997 2000  90623.06 90637.20  0.0 CS 0 1 2 0 101  97 R E 0 0                                           Intake Manifold Air Too
RR 3500 22-MAY-1997 3000  91067.93 91067.93 11.4 F5 992 288 4706 202 177 182 M E F 0  6 AB  M_S                       COP Trip
RR 3500 22-MAY-1997 4000  91067.93 91067.93 11.4 F5 992 288 4706 202 177 182 M E F 0  6 AB  M_S                       COP Trip
RR 3500 22-MAY-1997 5000  91068.70 91068.71 16.5 F4 885 338 2864 133 175 186 M E 2 4  6 AB  M_S                       COP Trip
RR 3500 22-MAY-1997 6000  91068.70 91068.71 16.5 F4 885 338 2864 133 175 186 M E 2 4  6 AB  M_S                       COP Trip
RR 3500 22-MAY-1997 7000  91068.71 000       17.9 F1 458   6   0 174 186 R E F 4  E AB                                Fault Reset While In I.e
RR 3500 22-MAY-1997 8000  91068.71 000       17.9 F1 458   6   0 174 186 R E F 4  E AB                                Fault Reset While In I.e
RR 3500 22-MAY-1997 9000  91069.55 91069.55 23.1 F5 992 474 3005 148 180 187 M E 2 0 R  6 AB  M_S                     COP Trip
RR 3500 22-MAY-1997 1111  91069.55 91069.55 23.1 F5 992 474 3005 148 180 187 M E 2 0 R  6 AB  M_S                     COP Trip
RR 3500 22-MAY-1997 2222  91069.56 91069.58 27.4 F6 1010 506 2405 128 179 189 M E F 4  6 AB  M_S                      COP Trip
```

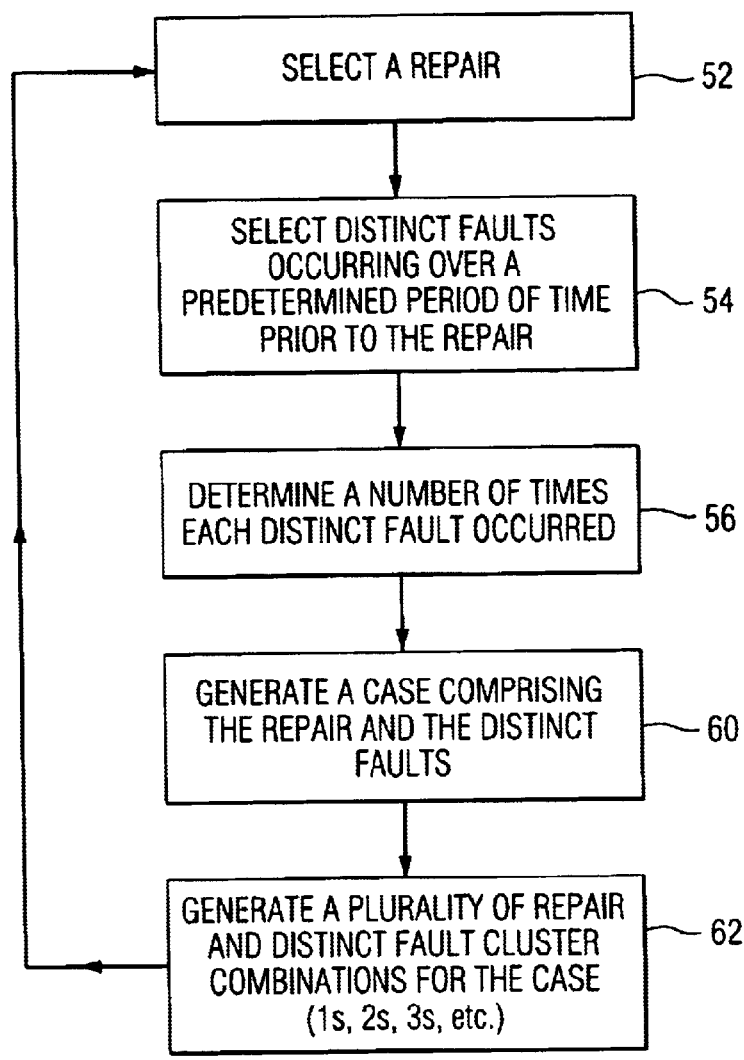

```
  90 ── RR_3500 31-DEC-1997_2322-SIGNATURES_ONES
            7A5D
  91 {      7A4A
            76D5
```
*FIG. 6A*

```
  92 ── RR_3500 31-DEC-1997_2322-SIGNATURES_TWOS
          7A5D  7A4A
  94 {    7A5D  76D5
          7A4A  76D5
```
*FIG. 6B*

```
  96 ── RR_3500 31-DEC-1997_2322-SIGNATURES_THREES
  89 ──    7A5D  7A4A  76D5
```
*FIG. 6C*

| 122 | 123 | 124 | 125 |
|---|---|---|---|
| CPR | 9517 | 01-JAN-1998 | 15-JAN-1998 |
| 70E8 | 1 | 4 | |
| 72AB | 1 | 2 | |
| 7140 | 1 | 3 | 5 3 4 3 5 1 1 |
| 722B | 1 | 2 | 129 |
| 73AB | 1 | 2 | |
| 74AB | 1 | 2 | |
| 732B | 1 | 2 | |
| 126 | 127 | 128 | |

*FIG. 12*

```
         2322_ONES
    152⁀778A 1⁀154
       7C89 1
       7150 4
       7A4A 1
       7151 1                    160
150    7313 1                    ―      2322_TWOS
       7A4C 1                 162⁀              ⁀164
       7152 1                    7A5D 76D5 20
       7153 2                    7A5D 7A4A  1    } FIG. 8B
       7154 5                    7A4A 76D5  1
       7390 1                        ⋮
       73A3 3
       7C18 2
       7C91 3
       7C92 1
       7C94 1
       73AC 1
       7080 2
       7404 1
       7405 2     } FIG. 8A
       7081 1
       7325 3
       7A5D 23
       7082 2
       7083 2
       7407 1                    170
       7084 1                    ―    2322_THREES
       7085 1                                    174
       7086 1                 172⁀              ⁀
       7484 1                    7A5D 7A4A 76D5 1  } FIG. 8C
       7485 2                        ⋮
       7487 1
       7A62 3
       7A63 1
       7A67 1
       76D5 24
       7A68 1
       748F 2
       7013 1
          ⋮
```

ALL_ONES
182⌢7A58 1⌒184
180  7A59 6
7A4A 4
CA17 3
7320 2
7401 13
CA18 2
7402 12
73AB 17
7403 1
73AC 23
7322 7
7404 21
7323 12
7080 50
7324 2
7405 33
7081 23
7325 16
7406 1
7082 23
7A5D 84
7326 2
7164 1
7A5E 1
7407 23
7083 25
C75D 2
7A5F 1
7084 26
7085 29
7329 2
76D5 24
7089 3
7A60 2
⋮

} *FIG. 9A*

190  ALL_TWOS
194⎯⎯⎯⎯⎯⎯⌒196
7A5D 76D5 73
7A5D 7A4A 1
7A4A 76D5 4
⋮

} *FIG. 9B*

200  ALL_THREES
202⎯⎯⎯⎯⎯⎯ 204
7A5D 7A4A 76D5 1
⋮

| 212 | 213 | 214 |
|---|---|---|
| 7405 | 2302 | 0.090 |
| 7405 | 2142 | 0.090 |
| 7405 | 2423 | 0.030 |
| 7405 | 1742 | 0.030 |
| 7405 | 1745 | 0.090 |
| 7A5D | 2320 | 0.107 |
| 7A5D | 2322 | 0.273 |
| 7A5D | 2323 | 0.261 |
| 7A5D | 2206 | 0.047 |
| 7A5D | 2129 | 0.023 |
| 7A5D | 1716 | 0.011 |
| 740F | 1745 | 0.080 |
| 740F | 1783 | 0.016 |
| 740F | 1867 | 0.032 |
| 740F | 1868 | 0.016 |
| 740F | 1869 | 0.080 |
| 740F | 1788 | 0.016 |
| 76D5 | 2320 | 0.029 |
| 76D5 | 2007 | 0.022 |
| 76D5 | 2322 | 0.089 |
| 76D5 | 2323 | 0.160 |
| 76D5 | 2206 | 0.089 |
| 76D5 | 2129 | 0.022 |
| 76D5 | 1715 | 0.003 |
| 76D5 | 1716 | 0.007 |
| 7A4A | 2322 | 0.250 |

| 222 | | 223 | 224 |
|---|---|---|---|
| 7A5D | 76D5 | 2320 | 0.095 |
| 7A5D | 76D5 | 2322 | 0.273 |
| 7A5D | 76D5 | 2323 | 0.287 |
| 7A5D | 76D5 | 2206 | 0.054 |
| 7A5D | 76D5 | 2129 | 0.027 |
| 7A5D | 76D5 | 1716 | 0.013 |
| 7A5D | 76D5 | 2329 | 0.109 |
| 7A5D | 76D5 | 1678 | 0.013 |
| 7A5D | 76D5 | 2333 | 0.041 |
| 7A5D | 76D5 | 1681 | 0.013 |
| 7A5D | 76D5 | 1501 | 0.013 |
| 7A5D | 76D5 | 2151 | 0.013 |
| 7A5D | 76D5 | 1742 | 0.013 |
| 7A5D | 76D5 | 1707 | 0.027 |
| 7A5D | 7A4A | 2322 | 1.000 |
| 7A4A | 76D5 | 2322 | 0.250 |

| 232 | | | 234 | 236 |
|---|---|---|---|---|
| 7A5D | 7A4A | 76D5 | 2322 | 1.000 |

METHOD FOR ADAPTIVE THRESHOLD COMPUTATION FOR TIME AND FREQUENCY BASED ANOMALOUS FEATURE IDENTIFICATION IN FAULT LOG DATA

This patent application claims the benefit of U.S. Provisional Application No. 60/161,974 filed on Oct. 28, 1999.

BACKGROUND OF THE INVENTION

The present invention relates generally to machine diagnostics, and more specifically to a system and method that improves diagnostic accuracy by introducing time-related features to be used for the evaluation of diagnostic significance and the identification of high probability repairs that will resolve a machine fault.

A machine, such as a locomotive or other complex system used in industrial processes, medical imaging, telecommunications, aerospace applications, and power generation may include controls and sensors for monitoring the various systems and subsystems of the machine and generating a fault indication when an anomalous operating condition occurs. Because the malfunction can impair the ability of the owner to conduct business efficiently and cost effectively, it is essential to diagnose and repair the machine accurately and quickly.

Such complex machines usually generate an error log, containing information describing the sequence of events that occurred during both routine operation and during any malfunction situation. The field engineer called to diagnose and repair the machine, will first consult the error log to begin the diagnosis. The error log presents a "signature" of the machine's operation and can be used to identify and correlate malfunctions. Using her accumulated experiences at solving machine malfunctions, the field engineer reviews the error log to find symptoms that point to a specific fault and then repairs the machine to correct the problem. If the diagnosis was accurate, the repair will correct the machine malfunction. When the error log contains only a small amount of information, this manual process will work fairly well. However, if the error log is voluminous and certain entries have an uncertain relationship or perhaps no relationship to the malfunction, as is usually the case for large complex machines, it will be very difficult for the field engineer to properly review and comprehend the information and successfully diagnose the fault.

To overcome the problems associated with evaluating large amounts of data in error logs, computer-based diagnostic expert systems have been developed and put to use. These diagnostic expert systems are developed by interviewing field engineers to determine how they proceed to diagnose and fix a machine malfunction. The interview results are then translated into rules and procedures that are stored in a repository, which forms either a rule base or a knowledge base. The rule or knowledge base works in conjunction with a rule interpreter or a knowledge processor to form the diagnostic expert system. In operation, based on information input by the technician, the rule interpreter or knowledge processor can quickly find needed information in the rule or knowledge base to evaluate the operation of the malfunctioning machine and provide guidance to the field engineer. One disadvantage associated with such conventional diagnostic expert systems is the limited scope of the rules or knowledge stored in the repository. The process of knowledge extraction from experts is time consuming, error prone and expensive. Finally, the rules are brittle and cannot be updated easily. To update the diagnostic expert system, the field engineers have to be frequently interviewed so that the rules and knowledge base can be reformulated.

Another class of diagnostic systems use artificial neural networks to correlate data to diagnose machine faults. An artificial neural network typically includes a number of input terminals, a layer of output nodes, and one or more "hidden" layer of nodes between the input and output nodes. Each node in each layer is connected to one or more nodes in the preceding and the following layer. The connections are via adjustable-weight links analogous to variable-coupling strength neurons. Before being placed in operation, the artificial neural network must be trained by iteratively adjusting the connection weights and offsets, using pairs of known input and output data, until the errors between the actual and known outputs, based on a consistent set of inputs, are acceptably small. A problem with using an artificial neural network for diagnosing machine malfunctions, is that the neural network does not produce explicit fault correlations that can be verified by experts and adjusted if desired. In addition, the conventional steps of training an artificial neural network do not provide a measure of its effectiveness so that more data can be added if necessary. Also, the effectiveness of the neural network is limited and does not work well for a large number of variables.

Case-based reasoning diagnostic expert systems can also be used to diagnose faults associated with malfunctioning machines. Case-based diagnostic systems use a collection of data, known as historical cases, and compare it to a new set of data, a new case, to diagnose faults. In this context, a case refers to a problem/solution pair that represents the diagnosis of a problem and the identification of an appropriate repair (i.e., solution). Case-based reasoning (CBR) is based on the observation that experiential knowledge (i.e., memory of past experiences) can be applied to solving current problems or determining the cause of current faults. The case-based reasoning process relies relatively little on pre-processing of raw input information or knowledge, but focuses instead on indexing, retrieving, reusing, comparing and archiving cases. Case-based reasoning assumes that each case is described by a fixed, known number of descriptive attributes and use a corpus of fully valid cases against which new incoming cases can be matched for the determination of the fault root cause and the identification of the repair that has the highest probability of resolving the fault, based on the historical cases.

Commonly assigned U.S. Pat. No. 5,463,768 discloses an approach to fault identification using error log data from one or more malfunctioning machines and a CBR tool. Each of the historical error logs contains data representative of events occurring within the malfunctioning machines. In particular, a plurality of historical error logs are grouped into case sets of common malfunctions. From the group of case sets, common patterns, i.e., identical consecutive rows or strings of error data (referred to as blocks) are used for comparison with new error log data. In this comparison process, sections of data in the new error log that are common to sections of data in each of the case sets (the historical error logs) are identified. A predicting process then predicts which of the common sections of data in the historical error logs and the new error log are indicative of a particular malfunction. Unfortunately, for a continuous fault code stream, any or all possible fault codes may occur from zero times to an infinite number of times, and the fault codes may occur in any order, so that a pre-defined structure and order for the error log data is nearly impossible. This feature of comparing error logs based on the sequence in which certain events occur represents a limitation on the process for determining the malfunction using historical error log data.

U.S. Issued Pat. No. 6,415,395 entitled "Method and System for Processing Repair Data and Fault Log Data to Facilitate Diagnostics", assigned to the same assignee of the present invention and herein incorporated by reference, discloses a system and method for processing historical repair data and historical fault log data, where this data is not analyzed based on sequential occurrences of faults, as in the commonly-owned patent described above. Instead, this system includes means for generating a plurality of cases from the repair data and the fault log data. Each case comprises a single repair and a plurality of related, but distinct faults. The faults in each case are grouped into a plurality of clusters, wherein the number of clusters is equal to the number of unique combinations of faults in the case. A weight value is assigned to each fault cluster, where the weight value indicates the likelihood that the repair will resolve the faults within that fault cluster. The weight is determined by dividing the number of times the fault combination (fault cluster) occurs in cases comprising related repairs by the number of times the fault combination occurs in all cases. To analyze a new fault, the new fault log data is entered into the system and compared with the plurality of fault log clusters. The repair associated with a matching fault log cluster represents a candidate repair to resolve the problem associated with the new fault log data. The candidate repairs are listed in descending order according to the calculated weight values.

Further, U.S. Issued Pat. No. 6,343,236, entitled "Method and System for Analyzing Fault Log Data for Diagnostics", assigned to the same assignee of the present invention and herein incorporated by reference, discloses a system and method for analyzing new fault log data from a malfunctioning machine, by comparison with historical fault logs, but again, where the system and method are not restricted to sequential occurrences of faults. The fault log data is clustered based on related faults and then compared with historical fault clusters. Each historical fault cluster has associated with it a repair wherein the correlation between the fault cluster and the repair is indicated by a repair weight. Upon locating a match between the current fault clusters and one or more of the historical fault clusters, a repair action is identified for the current fault cluster based on the repair associated with the matching historical fault cluster.

BRIEF SUMMARY OF THE INVENTION

This invention describes a method for improved fault isolation and resolution using fault logs from the failed machine together with historical repair information correlated with specific historical faults. The commonly assigned patent applications referred to above disclose a process providing reactive problem isolation occurring in machines. It is known that the presence of certain faults or anomalous conditions do not necessarily indicate the need for an actual repair in a machine. There is a complex implicit relationship between patterns of faults and the actual machine problem that necessitates a repair action. In these previously filed patent applications, combinations of fault patterns are utilized for mining the fault data in an effort to predict the most likely repair action. An important enhancement is provided by the present invention wherein the time-related behavior of a fault or a combination of faults is also used as a descriptive feature to improve the process of isolating a specific problem and generating the appropriate repair recommendation to resolve the fault.

The major components of the present invention involve first calculating a time window in which a fault occurs and then recording the frequency of fault occurrences over that time window. The method further includes a means for adaptively determining a nominal threshold for each fault during the time window and for determining a nominal threshold related to the frequency behavior of each fault over the time window. In particular, there are two thresholds or averages calculated in accordance with the teachings of the present invention. The first threshold is based on the number of days the specific fault occurs within a time window. Exemplary time windows include one month and two weeks. The second threshold or average is based on the number of occurrences for the specified fault in a given day, excluding those days in which the fault does not occur. Once the nominal thresholds are calculated, the present invention determines if a fault's behavior over the time window is anomalous and therefore does not require immediate attention. That is, do the number of occurrences of the fault over the time window exceed either of the nominal thresholds for that fault. When either or both of the diagnostic thresholds are exceeded (i.e., the number of occurrences over the time window and the number of occurrences in a particular day during the time window) then the fault behavior is diagnostically significant. Finally, it is necessary to merge the diagnostic results derived from the present invention with those rates identified using the techniques described in the commonly assigned patent applications discussed above.

BRIEF DESCRIPTION OF THE DRAWINGS

The features and advantages of the present invention will become apparent from the following detailed description of the invention when read together with the accompanying drawings in which:

FIG. 2 is an illustration of exemplary repair log data;

FIG. 3 is an illustration of exemplary fault log data;

FIG. 4 is a flowchart illustrating operation of certain aspects of the present invention;

FIGS. 5, 6A, 6B and 6C illustrate exemplary faults and fault clusters;

FIGS. 8A, 8B, 8C, 9A, 9B and 9C illustrate exemplary fault clusters developed in accordance with the present invention;

FIGS. 10A, 10B and 10C illustrate weighted repair and fault cluster combinations;

FIG. 12 illustrates the technique for selecting statistically significant faults.

DETAILED DESCRIPTION OF THE PREFERRED EMBODIMENTS

Figure 1:
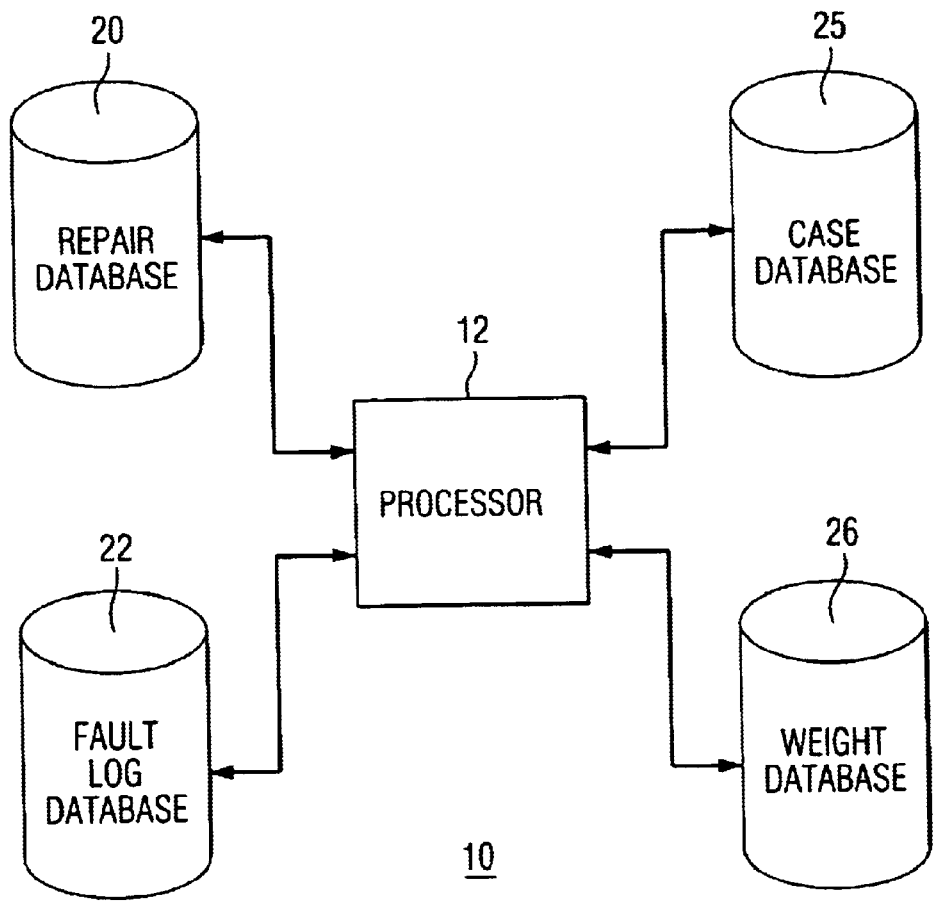
FIG. 1 is a block diagram of one embodiment of a system of the present invention using a processor for processing operation parametric and fault log data and repair data from one or more machines and diagnosing a malfunctioning machine.

Before describing in detail the particular technique for identifying anomalous features within fault log data in accordance with the present invention, it should be observed that the present invention resides primarily in a novel combination of steps and apparatus. Accordingly, the hardware components and method steps have been represented by conventional elements in the drawings, showing only those specific details that are pertinent to the present invention, so as not to obscure the disclosure with structural details that will be readily apparent to those skilled in the art having the benefit of the description herein.

FIG. 1 diagrammatically illustrates one embodiment of the diagnostic system 10 of the present invention for the purpose of identifying fault patterns and correlating these patterns with specific repair recommendations. The diagnostic system 10 provides a process for automatically harvesting or mining repair data describing related and unrelated repairs and fault log data from one or more machines, such as locomotives. The diagnostic system 10 generates weighted repair and distinct fault cluster combinations that are diagnostically significant predictors of the repair action that will resolve a newly identified fault in a malfunctioning machine. Thus, the historical data facilitates later analysis of new fault log data from a malfunctioning locomotive. In one embodiment of the invention, the diagnostic system 10 can jointly analyze the fault log and operational parameters from the malfunctioning locomotive.

Although the present invention is described with reference to a locomotive, the diagnostic system 10 can be used in conjunction with any machine where the operational parameters of the machine are monitored. Exemplary applications include chemical, electronic, mechanical, or microprocessor-based machines.

The exemplary diagnostic system 10 illustrated in FIG. 1 includes a processor 12 such as a computer (e.g., a UNIX workstation) having a hard drive, input devices such as a keyboard or a mouse, magnetic storage media (e.g., tape cartridges or disks), optical storage media (e.g., CD-ROM's), and output devices such as a display and a printer. The processor 12 is connected to and processes data input from a repair database 20 and a fault log database 22.

The repair database 20 includes repair data or records related to a plurality of related and unrelated repairs for one or more locomotives. Related repairs are those that involve identical or nearly identical systems or subsystems on the locomotive. Unrelated repairs involve systems and subsystems that are not related. The combination of related plus unrelated repairs defines the entire set of repairs performed on the locomotive. FIG. 2 shows an exemplary portion 30 of the repair data contained in the repair data database 20. The repair data includes a customer identifier in a column 32, a locomotive identification or locomotive road number in a column 33, the repair date in a column 34, a repair code in a column 35, a prose description of the repair code in a column 36, a description of the actual repair performed in a column 37, a description of the failure mode in a column 38, the sub-assembly to which the repair relates in a column 39, and the primary system to which the repair relates in a column 40.

The fault log database 22 includes fault log data or records describing a plurality of faults for one or more locomotives. Generally, it is advantageous to examine faults occurring both before and after a specific repair to determine whether the repair resolved the fault of interest. FIG. 3 shows an exemplary portion 40 of the fault log data stored in the fault log database 22. The fault log data may include a customer identifier in a column 42, a locomotive identifier or road number in a column 44, the date that the fault occurred in a column 45, a fault code in a column 46, and a prose description of the fault code in a column 48. The time at which the fault began and the time at which it ended are shown in two adjacent columns identified by a reference character 47. The times are shown in counter increments wherein the increment between counts is preselected. Once the increment and start time are selected, a simple algorithm can be used to convert the counter increments to eastern standard time. Additional information in the form of operating parametric values is shown in the fault log 40 within that area designated by a reference character 49. This operational information may include temperature sensor readings, pressure sensor readings, electrical voltage and current readings, and power output readings taken simultaneously with the fault occurrence. Operational conditions may also be shown within the area designated by the reference character 49. Such operational conditions include whether the locomotive is in a motoring or a dynamic braking mode of operation, whether any particular subsystem within the locomotive is undergoing a self test, whether the locomotive is stationary, and whether the engine is operating under maximum load conditions.

FIG. 4 is a flowchart of an exemplary process 50 of the present invention for selecting or extracting repair data from the repair database 20 and fault log data from the fault log database 22, and generating a plurality of diagnostic cases, that are stored in the case database 25. As used herein, the term "case" comprises a repair and one or more distinct faults (as represented by one or more distinct fault codes). The faults within a case are segregated into one or more fault clusters. Each fault cluster includes at least one fault and the number of fault clusters is equal to the number of fault combinations derived from the faults in the case. Also as used herein, the term "distinct fault" is a fault (represented by a fault code) that differs from other faults so that, as described in greater detail below, if the fault log data includes more than one occurrence of the same fault, the multiple occurrences are counted only once.

Continuing with FIG. 4, the process 50 comprises, at a step 52, selecting or extracting a repair from the repair database 20 (see FIG. 1). Once a repair has been identified at the step 52, the present invention searches the fault log database 22 to select or extract, at a step 54, distinct faults that occur over a predetermined period of time prior to the selected repair. The predetermined period, which is determined by the user, extends from a predetermined date prior to the repair to the date of the repair. For example, the period may extend from 14 days prior to the repair to the date of the repair. It will be appreciated by those skilled in the art that other time periods may be chosen. In any case, it is desirable that the same period of time be chosen for generating all the cases by way of the process 50. As also will be appreciated and as further discussed below, it is the selection of distinct faults that is important and not the order or sequence of their arrangement in the fault log data.

At a step 56, the number of times each distinct fault has occurred during the predetermined time period is determined. At a step 60, a case is created that comprises the selected repair and the distinct faults selected at the step 54.

FIG. 5 illustrates a case 70 generated in accord with the process 50. The case 70 comprises a file name 72 that lists, for example, a repair or a repair code 2322 (corresponding to the replacement of an electronic fuel injection pump), a customer identification number 74, a locomotive identification number or road number 76, a start date 78, and an end date 80 (representing the predetermined period referred to at the step 54), and a listing of the distinct fault codes 82 that occurred between the start date 78 and the end date 80. A column 84 shows the number of occurrences of each of the three faults listed in the rows 82, as determined at the step 56.

In the example of FIG. 5, fault code 7A5D indicates that the locomotive diesel engine failed to reach full operating power; fault code 7A4A indicates that an air conditioner compressor failed to start; fault code 76D5 indicates a fault reset. The case 70 may also list additional information, as shown in rows designated 86, such as various sensor readings or averages thereof. The sensor readings may include temperature, pressure, voltage, current, and engine power, etc., as measured at or near the time of the occurrence of the corresponding fault.

Returning to FIG. 4, at a step 62, repair and distinct fault cluster combinations are generated. For the exemplary case 70 in FIG. 5, there is a single repair code (2322) and three distinct fault codes (7A5D, 7A4A, and 76D5). The number of distinct fault cluster combinations is equal to the number of unique combinations derivable from the set of three faults in the exemplary case 70. There are a total of seven unique subset combinations that can be created from a three element set. That is, three sets having one element each, three sets having two elements each, and a single set having three elements.

FIGS. 6A, 6B and 6C illustrate the seven fault clusters generated from the exemplary case 70. A line 90 of FIG. 6A sets forth the relevant repair information. Lines 91 contain one fault code each. FIG. 6B illustrates three more clusters, each containing two fault codes. The repair information is set forth in a row 92 and the three fault code clusters are shown in rows 94. Finally, in FIG. 6C, the repair information is shown on a line 96 while the three element fault cluster is set forth on a line 98. Those skilled in the art will realize that a case having a greater number of distinct faults will result in a greater number of repair and fault cluster combinations. After the cases are created by the processor 12 executing the FIG. 4 flowchart, the cases are stored in the case database 25.

Following the step 62, the process 50 returns to the step 52 where another repair entry from the repair database 20 is selected, another case is created, and a plurality of repair and fault cluster combinations are created from within that case. The case database 25 (see FIG. 1) stores the plurality of cases comprising related and unrelated repairs and the plurality of repair and distinct fault cluster associated with each case.

Figure 7:
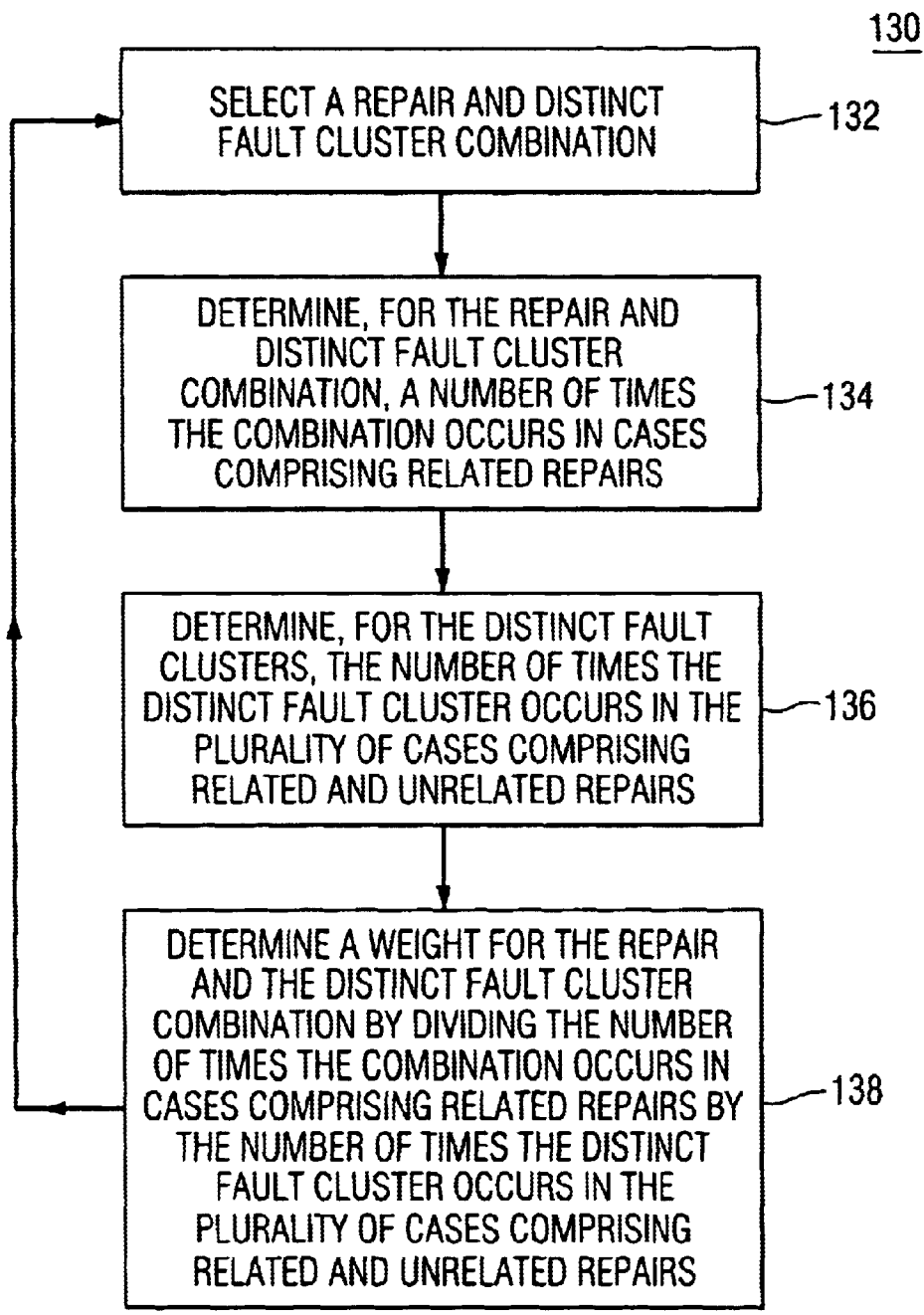
FIG. 7 is a flowchart depicting operation of certain features of the present invention.

FIG. 7 is a flow chart of an exemplary process 130 for generating weighted repair and fault cluster combinations based on the plurality of cases generated in the process 50 of FIG. 4. The process 130 comprises a step 132 wherein a repair and a distinct fault cluster combination are selected. At a step 134, a determination is made as to the number of times the combination selected in the step 132 occurs in the cases comprising related repairs. Then, at a step 136, the number of times the distinct fault cluster and repair combination occurs in the plurality of all cases comprising related and unrelated repairs is determined. At a step 138, a weight value for the selected repair and distinct fault cluster combination is calculated. The weight value is equal to the number of times the combination occurred in cases comprising related repairs (the step 134) divided by the number of times the distinct fault cluster and repair combination occurred in the plurality of cases comprising related and unrelated repairs (the step 136).

The process 130 is further described in greater detail with reference to FIGS. 8 through 10 and the exemplary cases set forth therein. FIG. 8A is a portion 150 of the plurality of single fault clusters generated from 38 cases related to repair code 2322. The fault code is shown in a column 152 and the number of occurrences for the fault is shown in a column 154. As can be seen, repair code 2322 and the single fault cluster code 76D5 combination occurred 24 times. A combination of repair code 2322 and the single fault cluster for fault code 7A5D occurred 23 times. Many of the single fault clusters in combination with repair code 2322 occurred only once, for example, fault code 7A4A. The single fault clusters created and illustrated in FIG. 8A are similar to the example shown in FIG. 6A. The only difference is the FIG. 8A example includes the number of occurrences for each fault.

FIG. 8B illustrates a portion 160 of the plurality of double fault code clusters generated from cases related to repair 2322. The dual fault cluster codes are listed in a column 162 and the number of occurrences for that cluster is set forth in a column 164. The number of occurrences for a combination fault cluster is determined by the number of times both faults in the combination occur within the given interval. If only one of the faults in a combination occurs during the period of interest, then obviously the combination never occurred. As shown in FIG. 8B, the cluster fault combination 785D/76D5 occurred 20 times in conjunction with repair code 2322. The fault combination 7A5D/7A4A and 7A4A/76D5 occurred only once. In FIG. 9C, a portion of the triple fault clusters 170 are shown in a column 172 and the number of occurrences for the fault cluster are set forth in a column 174. If there are n faults associated with repair code 2322 (that is, if n faults are listed in FIG. 8A) then there would be additional fault cluster combinations of four, five, six, up through n faults in the combination.

FIGS. 9A through 9C show portions of the single, double, and triple fault combination clusters generated from all of the plurality of cases (e.g., from all repairs, both related and unrelated repairs). In FIG. 9A, a portion 180 of all of the single fault clusters are listed. The fault clusters are listed in the column 182 and the number of occurrences are listed in the column 184. For example, the single fault cluster with fault code 76D5 occurred 24 times in all the generated cases. A portion 190 of the dual combination fault code clusters are illustrated in FIG. 9B. The dual fault clusters are listed in a column 194 and the number of occurrences is listed in a column 196. For example, the fault cluster combination 7A5D/76D5 occurred 73 times. In FIG. 9C, a portion 200 of the triplet fault cluster combinations is shown. The triplet fault cluster combinations are listed in a column 202 and the number of occurrences listed in a column 204. As those skilled in the art will realize, there are in fact n faults, therefore there will be fault clusters ranging from one fault per cluster to n faults per cluster.

The weighted repair and fault cluster combinations are illustrated in FIGS. 10A through 10C. These figures are representative of the weights calculated but show only a portion of each cluster combination. FIG. 10A illustrates a portion 210 of the weighted repair and single distinct fault cluster combinations. The fault codes are shown in a column 212, the repair codes are shown in a column 213, and the weighted values are shown in a column 214. It can be seen that repair code 2322 and single fault cluster 7A5D combination has a weight of 0.273. Interpreting this result, there is an approximately 27 percent chance that implementation of repair 2322 will resolve fault 7A5D. Similarly, there is only an approximately 9 percent chance that repair 2322 will resolve fault 76D5. FIG. 10B provides the same information except in this case for dual fault cluster combinations. There is a portion 220 of all dual fault cluster combination shown in FIG. 10B. The fault codes are shown in a column 222, the repair code in a column 223, and the weight value in a column 224. As can be seen, there is a 27.3 percent chance that execution of repair code 2322 will resolve both faults 7A5D and 76D5. Finally, a portion 230 of the triple fault code combinations are shown in FIG. 10C. The fault codes are listed in a column 232, the repair codes are listed in a column 234, and the weighted value is listed in a column 236. It can be seen that there is a 100 percent probability that implementation of repair code 2322 will resolve all of the faults 7A5D/7A4A/76D5. Note that the fault occurrences are not independent and therefore it is possible to have more than one weight value equal to 1.0.

Figure 11:
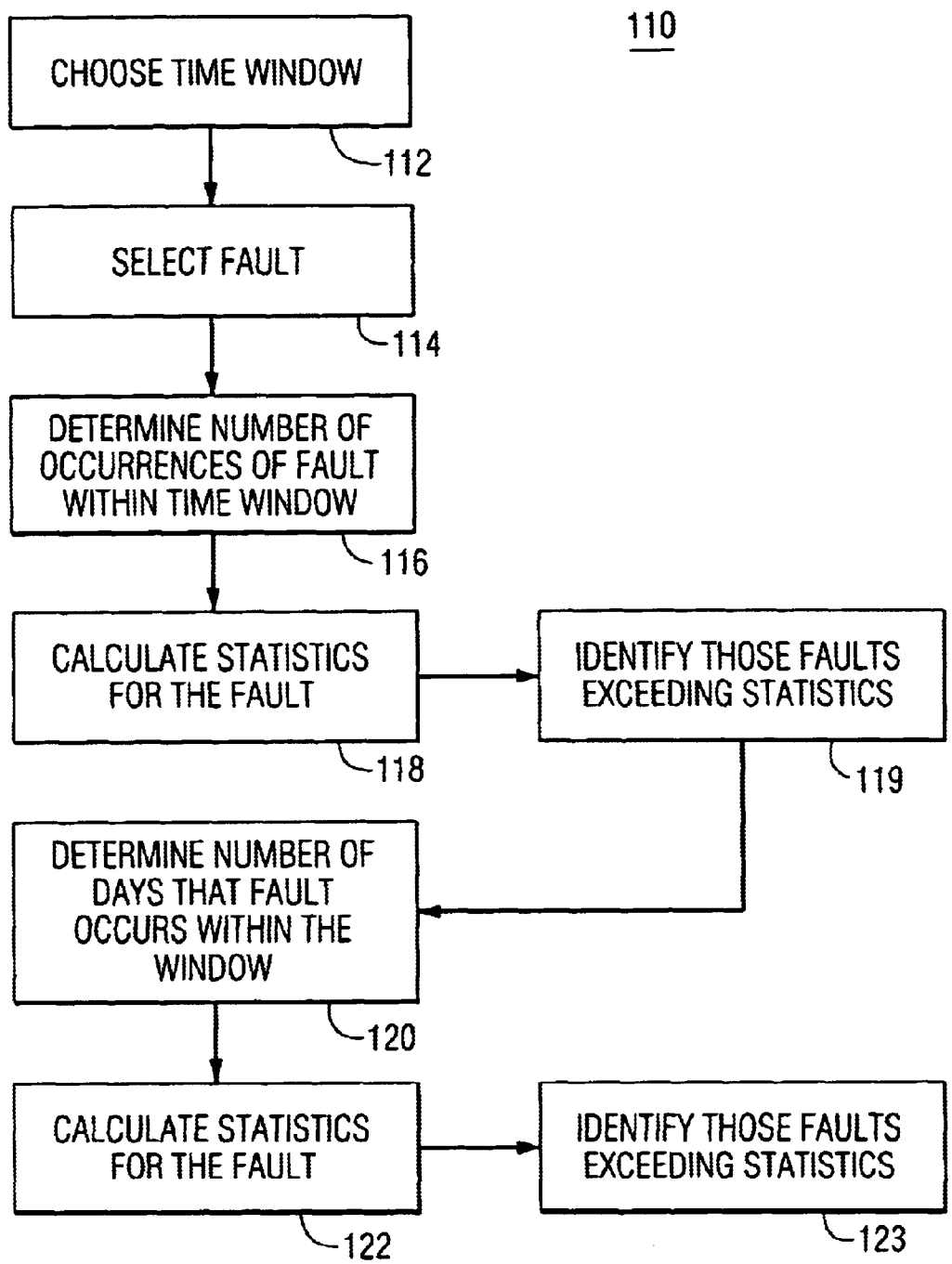
FIG. 11 is a flowchart illustrating certain operations of the present invention.

FIG. 11 illustrates an exemplary process 110 for calculating typical fault behavior using time differentiated criteria as taught by the present invention. The first criteria relates to the number of times a fault occurs within a selected time window. This is intended to recognize a pattern where a specific fault manifests itself by occurring over the course of many days. The second criteria measures the number of occurrences of each fault on a particular day. This process is intended to identify a fault pattern when a fault occurs an unusually high number of times in a day. Statistical calculations are then performed on these results to compute data that is used later, as will be discussed further herein below, to calculate the fault cluster weights identifying the most likely repair that will correct the faults in that fault cluster.

At a step 112, a time window reference is chosen and at a step 114, a specific fault is selected, for instance from among the faults identified in the rows 82 of FIG. 5. At a step 116, a determination is made as to the number of occurrences of the selected fault within the time window. Certain statistics are calculated based on the results of step 116, for instance the mean or median of the number of occurrences of the fault within the time window. At a step 119, the faults exceeding the calculated statistics are identified. Then, at a step 120, the number of days that the fault occurred within the time window is determined. If the fault occurred at least one time during the day, then that day is included within the determination of step 120. At a step 122, statistical calculations are performed on the data determined at the step 120. Again, these statistical calculations could be something as simple as the mean and the median for the number of occurrences in a day. Those skilled in the art of statistics and random processes will recognize that other statistical measures could also be applied to the collected data. At a step 123, the faults exceeding the calculated statistics are identified.

A sample case with associated information for calculating the thresholds in accord with the process 110 is shown in FIG. 12. A railroad identifier is shown in a segment 122, and the railroad locomotive is identified in a segment 123. Segments 124 and 125 show the start and end dates for the chosen time window (see the step 112 of FIG. 11). A plurality of faults are listed in a column 126, and the total number of days each fault occurred between January 1 and January 15 of 1998 is listed in a column 127. A column 128 shows the average number of occurrences for the fault per day (counting only those days on which the fault occurred). A row 129 lists the number of occurrences for the fault 7140 on each of the seven days that it occurred between Jan. 1 and Jan. 15, 1998.

In essence, the process of FIG. 11 has reduced the set of fault log information that is harvested from the locomotive or machine undergoing analysis to include only those of statistical significance. The process 110 of FIG. 11 provides as an output only those faults that have a heightened sense of significance with respect to all the faults occurring in the machine. These faults are selected based upon their occurrence more than an average number of times in a given day or more than an average number of days in a given time frame. Having now reduced the set of faults and located those that have a higher degree of significance to the repair process, these faults are now used as inputs to the process 50 illustrated in FIG. 4. That is, a repair is selected at the step 52 and the faults occurring within a predetermined time prior to that repair are selected at the step 54. In executing the step 54, the domain is limited to those faults having heightened significance as a result of satisfying the statistics generated by the process 110 of FIG. 11, i.e., having been selected at either the step 119 or the step 123. At the conclusion of the process 50, the plurality of repair and distinct fault clusters have been created. Now the process 130 (see FIG. 7) is executed so that a weight can be determined. At the step 136 of FIG. 7, recall that the number of times the distinct fault cluster occurs in a plurality of cases comprising related and unrelated repairs is determined. Now that the set of faults has been reduced to only those that are statistically significant, the calculation carried out at the step 136 can be limited so as to include only those faults having statistical significance. In another embodiment, all faults (including both those that are deemed statistically significant and those that are not deemed statistically significant in accord with the FIG. 11 process) are included in the result calculated at the step 136. An exemplary result produced by the process 130 is shown below in Table 1.

The table below illustrates the additional discriminating functionality provided by the teachings of the present invention. Using the processes 50 and 130 (FIGS. 4 and 7), the fault 7140 has been calculated to indicate 38 different repairs with the maximum likelihood repair being a speed sensor repair (1707). There is a 25 percent likelihood that the speed sensor repair will resolve fault 7140. Turning now to Table 1, fault 7140 occurs an average of 3.1 days in the selected time window, and using only the instances where fault 7140 occurs more than the 3.1 average number of days in the selected window, there are 14 different repairs indicated as fixes for the fault 7140. See line 2 of Table 1. As a result, the likelihood that repair 1707 will resolve fault 7140 rises to 47 percent. This percentage value was calculated as discussed above, by taking only those situations where fault 7140 occurred more than the average number of days (i.e., 3.1) during the predetermined case window (as calculated by FIG. 11) and using these as input data to the processes illustrated in FIGS. 4 and 7. Similarly, according to the next line of the table (7140*), there are an average of 4.4 7140 faults per day in the selected time window. Taking only those faults that occur more than 4.4 times in one day, and using those faults as the domain for the FIGS. 4 and 8 processes, only 22 different repairs are identified as possible resolutions for the 7140 fault. As a result, the FIG. 7 process at the step 138 calculates a weight of 39 percent likelihood that the 1707 repair will resolve the 7140 fault. The 47% probability (and the 39% probability) increases the confidence level that fault 7140 will be resolved by a speed sensor repair (1707), above the 25% as calculated using all occurring faults.

TABLE 1

| | True Ground Speed Sensor (Repair 1707) | |
|---|---|---|
| Fault 7140 | 38 different repairs | 1707 with 25% |
| Fault 7140+ | 14 different repairs | 1707 with 47% where avg is 3.1 |
| Fault 7140* | 22 different repairs | 1707 with 39% where avg is 4.4 |
| | Example: Fuses (1702) | |
| 7097 | 20 different repairs | 1702 with 28% |

TABLE 1-continued

| 7097+ | 6 different repairs | 1702 with 37% where avg is 1.3 |
| 7097* | 2 different repairs | 1702 with 91% where avg is 5.2 |

+fault occurs on an above average number of days in the case
*fault occurs on an above average number of times in one day in the case The table shows similar results for a fault 7097. When calculated without regard to statistically significant occurrences, 20 different repairs are candidates for resolution of fault 7097. The highest percentage repair is number 1702 with a value of 28 percent. It has been calculated in accord with the process 110 of FIG. 7 that fault 7097 occurs on an average of 1.3 days in the time window selected. The 7097+ value in the table indicates the number of days when the fault exceeded the 1.3 average value. Now using the processes of FIGS. 4 and 7, only six different repairs are indicated, with the 1702 repair having a 37 percent likelihood of resolving the 7097 fault. Finally, the process 110 determined that the fault 7097 occurs an average of 5.2 times during any one day in a selected window. When looking at only those situations where the fault 7097 occurred more than 5.2 times in one day and processing them through the FIGS. 4 and 7 processes, only two different repairs are indicated. Now the repair 1072 has a 91 percent likelihood of resolving the 7097 fault. Thus, it is seen that using only those faults that are statistically significant (defined herein as those occurring more than a given number of times within a selected time window or occurring on more than a given number of days during a selected window) increases the likelihood of identifying the correct repair to resolve the fault.

While the invention has been described with reference to a preferred embodiment, it will be understood by those skilled in the art that various changes may be made and equivalent elements may be substituted for elements thereof without departing from the scope of the present invention. In addition, modifications may be made to adapt a particular situation more material to the teachings of the present invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for processing repair data and fault data comprising a plurality of faults from one or more machines, said method for facilitating analysis of a malfunctioning machine comprising:
   (a) selecting from the fault data those faults having significant statistical relevance further comprising;
   (a)(1) selecting at least one time window;
   (a)(2) determining a threshold;
   (a)(3) determining the number of occurrences of a fault during the time window;
   (a)(4) determining the relationship between the number of occurrences of the fault and the threshold; and
   (a)(5) in response to step (a4), determining the faults having significant statistical relevance;
   (b) selecting a repair from the repair data;
   (c) generating a case using the selected repair from step (b) and the selected faults from step (a);
   (d) generating for each of the cases at least one repair and distinct fault cluster combination; and
   (e) assigning a weight to each of the repair and distinct fault cluster combinations whereby the weight facilitates prediction of at least one repair for the malfunctioning machine.

2. The method of claim 1 wherein the at least one repair and distinct fault cluster combination comprises a plurality of combinations of the repair and the plurality of distinct statistically significant faults, wherein the number of combinations is equal to the number of unique combinations derivable from the set of the plurality of distinct statistically significant faults.

3. The method of claim 1 wherein the step of assigning weights comprises determining, for each repair and distinct fault cluster combination, the number of times the combination occurs in cases comprising related repairs, and the number of times the combination occurs in the plurality of cases, and dividing the number of times the combination occurs in cases comprising related repairs by the number of times the combination occurs in the plurality of cases.

4. The method of claim 1 wherein the statistically significant faults include those exceeding an average number of occurrences within the at least one time window.

5. The method of claim 1 wherein the statistically significant faults includes those exceeding a daily occurrence average within the at least one time window.

6. The method of claim 1 further comprising:
   generating a new case from repair data and fault data, the new case comprising a repair and a plurality of distinct statistically significant faults;
   generating, for the new case, a plurality of fault clusters for the plurality of distinct faults; and
   redetermining a weight for each of the plurality of repair and fault clusters combinations to include the new case.

7. A system for processing repair data and fault data comprising a plurality of faults from one or more machines, said system for facilitating analysis of a malfunctioning machine comprising:
   means for selecting from the fault data those faults having significant statistical relevance, further comprising:
   means for selecting at least one time window;
   means for determining a threshold;
   means for determining the number of occurrences of a fault during the time window;
   means for determining the relationship between the number of occurrences of the fault and the threshold;
   in response to the means for determining the relationship, means for determining that the fault has significant statistical relevance;
   means for generating a plurality of cases from the repair data and the selected fault data, wherein each case comprises a repair and a plurality of distinct statistically significant faults;
   means for generating for each of the cases at least one repair and distinct fault cluster combination; and
   means for assigning a weight to each of the repair and distinct fault cluster combinations whereby the weight facilitates prediction of at least one repair for the malfunctioning machine.

8. The system of claim 7 wherein the at least one repair and distinct fault cluster combination comprises a plurality of combinations of the repair and the plurality of distinct statistically significant faults, wherein the number of combinations is equal to the number of unique combinations derivable from the set of the plurality of distinct statistically significant faults.

9. The system of claim 7 wherein the means for assigning weights comprises means for determining, for each repair and distinct fault cluster combination, a number of times the combination occurs in cases comprising related repairs, and a number of times the combination occurs in the plurality of cases, and means for dividing the number of times the combination occurs in cases comprising related repairs by the number of times the combination occurs in the plurality of cases.

10. The system of claim 7 wherein the statistically significant faults include those having an above average number of occurrences within the at least one time window.

11. The system of claim 7 wherein the statistically significant faults includes those occurring at least once on more than the average number of days within the at least one time window.

12. A system for processing repair data and fault data comprising a plurality of faults from one or more machines, said system for facilitating analysis of a malfunctioning machine comprising:

a fault selector for selecting at least one time window, for determining a threshold, for determining the number of occurrences of the selected fault during the time window, for determining whether the number of fault occurrences exceeds the threshold, and for selecting faults for which the number of occurrences exceeds the threshold;

a case creator for generating a plurality of cases from the repair data and the selected faults, wherein each case comprises a repair and the selected faults having relevance to the repair;

a cluster creator for generating for each of the cases at least one repair and distinct fault cluster combination; and a weight calculator for assigning a weight to each of the repair and distinct fault cluster combinations whereby the weight facilitates prediction of at least one repair for the malfunctioning machine.

13. The system of claim 12 wherein the at least one repair and distinct fault cluster combination comprises a plurality of combinations of the repair and the selected faults wherein the number of such combinations is equal to the number of unique combinations derivable from the set of the selected faults.

14. The system of claim 12 wherein the selected faults relevant to the repair include only the faults occurring over a period of time prior to the repair.

15. The system of claim 12 wherein the weight calculator comprises:

a counter for determining for each repair and distinct fault cluster combination, a number of times the combination occurs in cases comprising related repairs and a number of times the combination occurs in the plurality of cases; and a divider for dividing the number of times the combination occurs in cases comprising related repairs by the number of times the combination occurs in the plurality of cases, wherein the result is the weight.

16. The system of claim 12 wherein the selected faults include those having an above average number of occurrences within the at least one time window.

17. The system of claim 12 wherein the selected faults includes those occurring on an above average number of days within the at least one time window.

18. An article of manufacture comprising:

a computer program product comprising computer usable medium having computer readable program code means embodied therein for causing the processing of repair data comprising a plurality of repairs and fault data comprising a plurality of faults from one or more machines, to facilitate analysis of a malfunctioning machine, computer readable program code in said article of manufacture comprising:

computer readable program code for causing a computer to select faults from among the fault data by selecting at least one time window, determining a threshold, determining the number of occurrences of a fault during the time window, determining the relationship between the number of occurrences of the fault and the threshold, and selecting faults in response to the relationship between the number of occurrences of the fault and the threshold;

computer readable program code for causing a computer to generate a plurality of cases from the repair data and the selected fault data, wherein each case comprises a repair and the selected faults;

computer readable program code for causing a computer to generate for each of the plurality of cases a plurality of clusters, wherein each cluster includes a repair and one element from the set of all unique combinations derivable from the selected faults; and computer readable program code for causing a computer to assign a weight to each of the clusters, whereby the weight facilitates prediction of at least one repair for the malfunctioning machine.

* * * * *